Sept. 5, 1967 E. E. THIESSEN 3,340,448
TRACTION MOTOR POWER SUPPLY SYSTEM
Filed Nov. 4, 1964
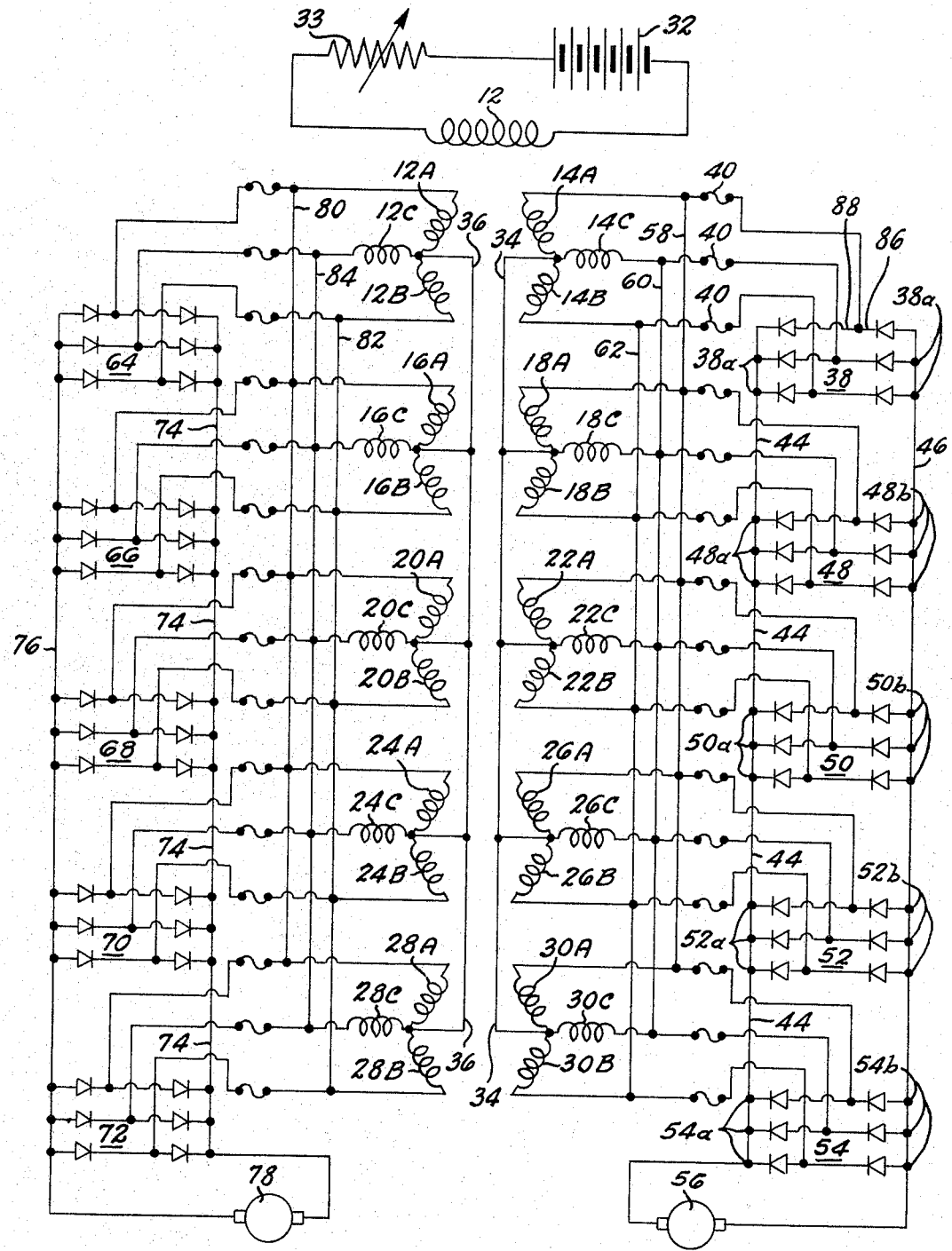
INVENTOR.
ELMER E. THIESSEN
BY C. R. Meland
HIS ATTORNEY

United States Patent Office 3,340,448
Patented Sept. 5, 1967

3,340,448
TRACTION MOTOR POWER SUPPLY SYSTEM
Elmer E. Thiessen, La Grange, Ill., assignor to General Motors Corporation, Detroit, Mich., a corporation of Delaware
Filed Nov. 4, 1964, Ser. No. 408,980
4 Claims. (Cl. 318—140)

ABSTRACT OF THE DISCLOSURE

This invention relates to a power supply system for the traction motors of a locomotive. An alternating current generator is provided which has a plurality of three-phase Y-connected windings and a like number of three-phase full-wave bridge rectifiers connected respectively with the three-phase windings. The bridge rectifiers feed traction motors for powering the locomotive. The neutrals of the three-phase windings are connected together and like phase windings of each three-phase winding are connected together on the AC side of the bridge rectifiers.

---

This invention relates to an electrical system for powering the traction motors of a locomotive and more particularly to an electrical system where the direct current traction motors are fed from a diode-rectified alternating current generator.

In my copending application, Ser. No. 343,737, filed on Feb. 10, 1964, a traction motor power supply system is disclosed and claimed where the phase windings of an alternating current generator are arranged such that the output voltages of respective phase windings are in phase and where the phase windings are connected with a plurality of three phase full-wave bridge rectifier networks. In this system, a fuse is connected between each phase winding and a junction of two diodes and if this fuse opens, the phase winding is disconnected from the junction of the two diodes.

In the system of my above-identified copending application, the opening of a fuse causes unbalanced load currents and under certain conditions, may require that the system be shut down for repair.

In contrast to the system of my copending application, it is an object of this invention to provide a traction motor power supply system where the phase windings of the generator are connected together so that one of the phase windings is not disconnected from the rectifying circuit when a fault occurs to open a fuse. In this type of system, the diodes of the rectifying circuit are matched as to forward voltage drop and with this arrangement, the system can still operate even though one of the diodes shorts causing an opening of one of the fuses.

It accordingly is one of the objects of this invention to provide a power supply system for the traction motors of a locomotive which includes an alternating current generator and a plurality of rectifying diodes, the forward voltage drop of the diodes being matched.

Still another object of this invention is to provide a traction motor supply system that includes an alternating current generator that has a plurality of individual phase windings arranged such that the voltages induced in the phase windings are in phase and wherein the phase windings are connected together and to the rectifying diodes.

Another object of this invention is to provide a power supply system for DC traction motors which includes an alternating current generator having two groups of output windings, each group representing alternate pole phase windings connected to respective rectifier banks.

Further objects and advantages of the present invention will be apparent from the following description, reference being had to the accompanying drawing wherein preferred embodiments of the present invention are clearly shown.

The single figure drawing is a schematic circuit diagram for a traction motor power supply system made in accordance with this invention.

Referring now to the drawing, the electrical system includes an alternating current generator which has a field winding 12 and a plurality of phase windings. The phase windings are designated by reference numerals 12A through 30A, 12B through 30B and 12C through 30C. In a preferred arrangement, these phase windings are wound on a fixed stator and are wound such that the voltages induced in windings 12A through 30A are in phase, the voltages induced in windings 12B through 30B are in phase and the voltages induced in windings 12C through 30C are in phase. In addition, the voltages induced in windings 12A, 12B and 12C are 120° out of phase to provide a three phase Y-connected arrangement. The same is true for the other phase windings, for example, phase windings 14A, 14B and 14C where these windings are wound such that the voltages induced in the windings are 120° out of phase.

As will be more fully described hereinafter, two groups of output windings are provided which respectively feed two rectifier banks. The first group of windings is illustrated on the drawing as windings 14, 18, 22, 26 and 30. The second group of windings includes windings 12, 16, 20, 24 and 28. The two groups of windings are wound symmetrically on the stator of the alternating current generator so that one group of windings and its associated rectifiers can be loaded while the other group of windings and its associated rectifiers are unloaded. This winding arrangement can be accomplished, for example, by winding the stator such that a winding begins with winding 12A, the next winding going circumferentially around the stator is 14B, the next winding is 16C, the next winding is 14A, the next winding is 16B and the next winding 18C and etc. around the stator so that two groups of symmetrical windings are provided which represent alternate pole phase windings. With this arrangement, the windings 14 through 30 are symmetrical on the stator as are the windings 12 through 28 and the entire winding comprised of both groups is symmetrical.

The field winding 12 can be wound on a rotor of the salient pole type which rotates within the stator that carries the stator windings. If desired, more than one field winding can be provided and the winding or windings is energized from a source of direct current 32 through a variable resistor 33.

The neutrals of the three phase Y-connected windings 14, 18, 22, 26 and 30 are connected together by a conductor 34. The neutrals of the three-phase, Y-connected windings 12, 16, 20, 24 and 28 are connected together by means of a conductor 36.

The phase windings 14A, 14B and 14C are connected with the AC input terminals of a three phase full-wave bridge rectifier network generally designated by reference numeral 38. This connection is made through the fuses 40. The three phase full wave bridge rectifier 38 is made up of six diodes which are of the PN junction semiconductor type and preferably are of the silicon type. It is seen that the positive DC output terminal of bridge rectifier 38 is connected with a conductor 44 while the negative DC output terminal 38B is connected with a conductor 46.

In a similar fashion, the three phase winding 18 is connected with bridge rectifier 48, three phase winding 22 is connected with bridge rectifier 50, three phase winding 26 is connected with bridge rectifier 52 and three phase winding 30 is connected with bridge rectifier 54. All of these bridge rectifiers feed the conductors 44 and 46 and these conductors in turn feed the DC traction motor 56 which drives the wheels of the locomotive.

One end of the phase windings 14A, 18A, 22A, 26A and 30A are connected together by means of a conductor 58. The ends of phase windings 14B, 18B, 22B and 30B are connected together by means of a conductor 62. The ends of phase windings 14C, 18C, 22C, 26C and 30C are connected together by means of a conductor 60.

The three-phase windings 12, 16, 20, 24 and 28 are connected respectively with the three phase full-wave bridge rectifiers 64, 66, 68, 70 and 72. The DC output terminals of these bridge rectifiers feed the power conductors 74 and 76 which in turn feed the traction motor 78. The traction motor 78 like the traction motor 76 serves to drive the wheels of the locomotive.

One side of the phase windings 12A, 16A, 20A, 24A and 28A are connected together by means of a conductor 80. One side of the phase windings 12B, 16B, 20B, 24B and 28B are connected together by means of a conductor 82. One side of the phase windings 12C, 16C, 20C, 24C and 28C are connected together by means of a conductor 84.

The diodes for each of the bridge rectifiers illustrated on the drawing must have substantially the same forward voltage drop so that there will be a proper division of load current. The diodes can be matched by selecting diodes that have a forward voltage drop that falls within a certain predetermined range so that the forward voltage rating of all the diodes is matched.

Although the system of this invention is shown supplying power to only two traction motors, it will be understood by those skilled in the art that additional traction motors would be paralleled with the traction motors 56 and 78. In addition, the power conductors 44 and 46 can be paralleled with the power conductors 74 and 76 and the traction motors fed from this parallel combination.

In the arrangement that has been described, the output voltages of the three-phase windings 12, 16, 20, 24 and 28 are in phase with the voltages of the three-phase windings 14, 18, 22, 26 and 30. It is possible to wind the stator of the alternator such that the output voltage of windings 12 through 28 is 60 electrical degrees out of phase with the output voltage of windings 14 through 30. This arrangement will reduce the ripple voltage applied to the traction motors when the power conductors 44 and 46 are in parallel with power conductors 74 and 76.

The diodes that make up the bridge rectifiers may be physically arranged in a manner illustrated in application Ser. No. 408,979, filed concurrently herewith and assigned to the assignee of this invention.

The system of this invention has certain advantages as compared to the system shown in my copending application Ser. No. 343,737. Thus with the system of this invention, the likelihood of shutting the entire system down for repair where a diode failure occurs is reduced since the phase currents remain substantially balanced even with a shorted diode. This system has the disadvantage as compared to the system of my copending application that matched diodes must be used to provide proper division in the event of diode failure.

It will be appreciated by those skilled in the art that each diode could be fused if so desired by connecting the fuses, for example, at points 86 and 88 in bridge rectifier 38 and at the same points in the other rectifier legs of bridge rectifier 38 and at the same points in the other bridge rectifiers.

In operation, the rotor of the alternating current generator which carries the field winding 12 is driven by a prime mover such as a diesel engine on the locomotive and an alternating current is developed in all of the phase windings. The alternating current is rectified to direct current which appears across the power conductors 44 and 46 and 74 and 76 which is then applied to the traction motors for driving the wheels of the locomotive.

While the embodiments of the present invention as herein disclosed constitute a preferred form, it is to be understood that other forms might be adopted.

What is claimed is as follows:

1. A power supply system for supplying direct current to the traction motors of a locomotive comprising, an alternating current generator having first and second groups of discrete three phase Y-connected output windings, first and second groups of three phase full-wave bridge rectifier networks connected respectively with said first and second groups of output windings, first and second power supply conductors connected with said first group of bridge rectifier networks for supplying direct current to a first traction motor, third and fourth power supply conductors connected with said second group of bridge rectifier networks for supplying direct current to a second traction motor, means connecting the neutrals of each group of three-phase windings together, means connecting the rectifier side of each phase winding of the three phase windings that feed the first groups of rectifiers together at points opposite the neutrals of said first group of three-phase windings, and means connecting the rectifier side of each phase winding of the three phase windings that feed the second group of rectifiers together at points opposite the neutrals of said second group of three-phase windings, said first and second groups of three phase windings being wound symmetrically on a stator such that they represent alternate pole phase windings connected respectively to said bridge rectifier networks, and circuit breaker means connected between a respective phase winding and the rectifiers of said bridge rectifier networks, said means that connects the rectifier side of the phase windings operating to maintain a given phase winding in an electrically loaded condition in the event that a circuit breaker means opens.

2. A power supply system for a direct current traction motor comprising, an alternating current generator including a stator, a stator winding carried by said stator, said stator winding comprising a plurality of discrete three-phase Y-connected windings wound symmetrically on said stator, individual like phase windings of respective three-phase windings having voltages induced therein which are in phase, a plurality of three-phase full-wave bridge rectifier networks equal in number to said three-phase Y-connected windings of said stator winding, each three-phase full-wave bridge rectifier network being comprised of a plurality of diodes and having AC input terminals connected respectively with a discrete three-phase Y-connected winding, power supply conductors connecting the direct current output terminals of said bridge rectifiers together, means connecting at least one direct current traction motor across said power supply conductors, a conductor means connecting like individual phase windings of each three-phase winding which have voltages that are in phase with each other at points opposite the neutrals of said three-phase windings and on the AC side of said bridge rectifier networks, circuit breaker means connected between the diodes of said bridge rectifier networks and respective phase windings of said three-phase windings, said conductor means which connects like phase windings of each three-phase winding operating to maintain a given phase winding in an electrically loaded condition in the event that one of said circuit breaker means opens.

3. The electrical system according to claim 2 where the neutrals of said three-phase windings are connected together.

4. A power supply system for feeding at least one direct current traction motor comprising, an alternating current generator having a stator including a stator winding in which voltages are induced, a rotor rotatable with respect to said stator winding adapted to be driven by a prime mover, said stator winding comprising a plurality of discrete three-phase Y-connected windings wound symmetrically on said stator, each three-phase winding having like phase windings which have voltages induced therein that are in phase with each other, a plurality of three-phase full-wave bridge rectifier networks equal in number to said three-phase windings of said stator, each bridge rectifier network including a plurality of diodes, the diodes of each three-phase full-wave bridge rectifier network having a forward voltage drop that is within a predetermined range, means connecting respective AC input terminals of each bridge rectifier network with respective three-phase windings of said stator, means connecting the direct current output terminals of said bridge rectifier networks together to form a pair of power supply conductors, at least one traction motor connected across said power supply conductors, means connecting the neutrals of said three-phase windings together, circuit breaker means connected between a respective phase winding of a respective three-phase winding and at least one diode of a respective bridge rectifier network, and means for maintaining a given phase winding of a respective three-phase winding in an electrically loaded condition when one of said circuit breaker means opens, said last named means comprising conductor means connecting respective like phase windings of each three-phase winding on the AC side of said bridge rectifier networks at points opposite the neutrals of said three-phase windings.

References Cited

UNITED STATES PATENTS

| | | | |
|---|---|---|---|
| Re. 23,314 | 12/1950 | Nims | 322—90 |
| 2,525,490 | 10/1950 | Kerr et al. | 290—14 |
| 3,017,558 | 1/1962 | Kozacka | 321—14 |
| 3,030,531 | 4/1962 | Lessmann | 310—18 |
| 3,098,963 | 7/1963 | Michaelis | 321—14 |
| 3,183,422 | 5/1965 | Stamm | 318—143 |
| 3,250,928 | 5/1966 | Bates | 310—68 |
| 3,263,142 | 7/1966 | Adoutte | 318—143 |

MILTON O. HIRSHFIELD, *Primary Examiner.*

J. D. MILLER, *Assistant Examiner.*